(12) United States Patent
Geiger et al.

(10) Patent No.: US 9,612,922 B2
(45) Date of Patent: Apr. 4, 2017

(54) COMPUTER SYSTEM AND METHOD FOR COMPARING OUTPUT SIGNALS

(75) Inventors: Dietmar Geiger, Ulm (DE); Michael Paulitsch, Ottobrunn (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 1221 days.

(21) Appl. No.: 13/638,438

(22) PCT Filed: Mar. 16, 2011

(86) PCT No.: PCT/DE2011/000268
§ 371 (c)(1),
(2), (4) Date: Nov. 8, 2012

(87) PCT Pub. No.: WO2011/120490
PCT Pub. Date: Oct. 6, 2011

(65) Prior Publication Data
US 2013/0060526 A1    Mar. 7, 2013

(30) Foreign Application Priority Data
Mar. 30, 2010    (DE) .......................... 10 2010 013 349

(51) Int. Cl.
*G06F 11/00*    (2006.01)
*G06F 11/16*    (2006.01)
*G06F 11/18*    (2006.01)

(52) U.S. Cl.
CPC ........ *G06F 11/1641* (2013.01); *G06F 11/184* (2013.01); *G06F 11/188* (2013.01)

(58) Field of Classification Search
CPC ... G06F 11/1641; G06F 11/184; G06F 11/188
USPC ........................................................ 714/25
See application file for complete search history.

(56) References Cited

U.S. PATENT DOCUMENTS

| | | | | |
|---|---|---|---|---|
| 4,581,701 A | * | 4/1986 | Hess | G05B 9/03 700/82 |
| 5,577,199 A | * | 11/1996 | Tanabe | G06F 11/185 714/37 |
| 5,931,959 A | * | 8/1999 | Kwiat | G06F 11/1487 714/11 |
| 2002/0046365 A1 | * | 4/2002 | Avizienis | G06F 11/2028 714/43 |

(Continued)

FOREIGN PATENT DOCUMENTS

| | | |
|---|---|---|
| EP | 0 496 506 A2 | 7/1992 |
| WO | WO 2009/090502 A1 | 7/2009 |

OTHER PUBLICATIONS

"The N-version approach to fault-tolerant software", IEEE Trans. Software Eng., SE11(12):1491-1501 (Dec. 1985).*

(Continued)

*Primary Examiner* — Yair Leibovich
(74) *Attorney, Agent, or Firm* — Crowell & Moring LLP (57) ABSTRACT

A computer system includes at least two COTS processor cores and an evaluating device connected to the at least two COTS processor cores for evaluating output signals output by means of the at least two COTS processor cores. The evaluating device includes a comparator for pair-wise comparison of the respective generated output signals with each other. The comparator also outputs a comparison signal corresponding to the respective comparison of the output signals.

9 Claims, 6 Drawing Sheets

(56) References Cited

U.S. PATENT DOCUMENTS

2007/0033511 A1     2/2007   Davies
2009/0031115 A1     1/2009   Pruiett et al.
2010/0287443 A1*   11/2010   Rohleder ................ G06F 11/10
                                                                                                 714/758

OTHER PUBLICATIONS

Corresponding International Search Report with English Translation dated Jul. 5, 2011 (six (6) pages).
German Office Action dated Feb. 2, 2011 (four (4) pages).
Riccardo Marian! et al., "Comparing Fail-Safe Microcontroller Architectures in Light of IEC 61508", $22^{nd}$ IEEE International Symposium on Defect and Fault Tolerance in VLSI Systems, 2007, pp. 123-131.

* cited by examiner

COMPUTER SYSTEM AND METHOD FOR COMPARING OUTPUT SIGNALS

The invention relates to a computer system and a method for comparing output signals that are output by means of at least two COTS processor cores. The invention also relates to a computer program.

BACKGROUND OF THE INVENTION

Computer systems used in safety-critical fields such as the aerospace industry, need to undergo various standardized test procedures, some of which are regulated by legislation. Such test procedures or standards comprise SAE ARP4754, SAE ARP4761, RTCA DO-178b or RTCA DO-254, in particular. Such safety-critical computer systems have, in particular, certified hardware components, such as circuits, manufactured specifically for the respective application, particularly application-specific integrated circuits (ASIC), processors or processor cores. In this context, particularly the RTCA DO-178b/ED-12B and the RTCA DO-254/ED-80 development and test procedures, subsequently called test procedures for short, demand a particularly intensive check on the design of the relevant hardware and the software running thereon. However, a drawback of this is that such test procedures are time consuming and expensive. Similarly, the development of appropriate hardware and software is expensive and time consuming. In addition, the specialization means of the hardware can often be used only for the respective safety-critical computer system.

SUMMARY OF THE INVENTION

Exemplary embodiments of the present invention are directed to a computer system, a method and a computer program that overcome the aforementioned disadvantages and, particularly in comparison with the prior art, allow less expensive computer systems with a high level of safety criticality.

Exemplary embodiments of the present invention are direct to a computer system that is able to ensure data integrity through the use of a plurality of dissimilar processor cores and also increase availability through the use of a plurality of processors. The invention comprises an arrangement of a computer system having at least two, for example three, COTS processor cores and having an evaluation device, connected to the at least two COTS processor cores, for evaluating output signals that are output by means of the COTS processor cores, wherein the evaluation device has comparison means for comparing the respective output signals that are output with one another in pairs, wherein the comparison means are also configured to output a comparison signal that corresponds to the respective comparison of the output signals.

By way of example, a network-on-a-chip (network-on-chip (NoC)) is connected to the COTS processor cores. An NoC is a communication subsystem of a system-on-a-chip (SoC), in particular, and may be configured to transmit the output signals to external receivers, for example. Such an external receiver may comprise a landing flap, a landing gear or a tail unit on an aircraft or on a space shuttle, for example. In this context, the NoC may be certified on the basis of the RTCA DO-254 test procedure, in particular. However, it is not necessary for the NoC to have successfully completed a certification of this kind or a similar certification process. It suffices if the NoC is certified for the specific application. By way of example, the NoC may be certified only for memory access, communication, a network, routing or preprocessing of data, for example as a filter, or for a combination of these. Such a NoC is less expensive to manufacture and nevertheless allows a failsafe and integrity-exhibiting computer system. By way of example, the NoC may comprise memory consistency logic.

The invention also provides a method for comparing output signals that are output by means of at least two COTS processor cores, comprising the following steps:
  the output signals are transmitted to an evaluation device having comparison means,
  the respective transmitted output signals are compared with one another in pairs by means of the comparison means,
  a comparison signal (integrity-exhibiting signal) that corresponds to the respective comparison of the output signals is output.

In the case of more than two processor cores, it is then also possible for the following step:
  one of the integrity-exhibiting signals is selected to be added.

Furthermore, a computer program is provided having program code for executing the method according to the invention when the computer program is executed on a computer.

The invention thus comprises the concept of comparing each of the output signals from COTS processor cores, which are connected to one another by means of a system-on-a-chip (SOC), for example, with one another in pairs and using these comparisons to ascertain which output signal exhibits integrity. An output signal corresponds to a result of a calculation performed by means of a COTS processor core, in particular. In this connection, integrity means that the result is within a particular error tolerance range. Only if this is the case will there be no inadmissible system state changes. In this respect, the system will have an admissible state.

The system according to the invention therefore allows particularly minimization of design errors for system-on-a-chip (SoC) systems.

In one simple exemplary refinement of the invention, the computer system comprises two different or dissimilar COTS processor cores, wherein a network-on-chip (NoC) is connected to the two processor cores and wherein the network-on-chip is also configured such as to compare the output signals that are output by the COTS processor cores. In particular, the NoC is an integrity-exhibiting NoC, and the NoC is connected to at least two COTS processor cores. An integrity-exhibiting NoC in this connection can be defined as a NoC that has been developed either on the basis of development and test procedures such as RTCA DO-178b and RTCA DO-254 or which can be equated to the aforementioned test procedures on the basis of special tests and technical arguments.

In a further exemplary refinement of the invention, the comparison of the output signals can be performed at least in part by means of the COTS processor cores. As a nonrestrictive example, the case of two COTS processor cores A and B is explained in more detail below.

Processor core A has calculated the result 1 and processor core B has calculated the result 0. Processor core A now compares its result with the result from processor core B, and processor core B compares its result with the result from processor core A. Processor cores A and B both establish that the results do not match, and they output an appropriate signal or comparison signal to the NoC. From this signal, the NoC will take the information that the two results, 1 and 0, can be rejected, since it is not possible to establish which result is correct.

Should processor cores A and B come to a different result for the comparison, that is to say that, by way of example, processor core A establishes that the results do not match, but processor core B is of the erroneous opinion that the results do match, then processor cores A and B will transmit corresponding signals or comparison signals to the NoC. From this, the NoC detects that at least one of the cores has calculated an incorrect result and rejects both results 1 and 0. In particular, this prevents incorrect results from being processed further.

In another exemplary refinement of the invention, provision may be made for the comparison signals from processor cores A and B to the transmitted to an external receiver by means of the NoC without the NoC handling the comparison signals further. The external receiver comprises further comparison means for comparing the comparison signals from the cores A and B. The comparison is thus performed not in the NoC but rather in the external receiver. By way of example, the receiver may comprise an actuator which is integrated in a landing flap or in a landing gear or in a tail unit, in particular.

The abbreviation COTS is an abbreviation which is known to a person skilled in the art and means "Commercial off the shelf" or "components off the shelf". COTS-hardware comprises hardware from series-produced elements without specific customization to a prescribed application. By way of example, COTS processor cores may be processor cores of known processors from IBM, ARM, Intel, AMD or VIA, as are used particularly in known mobile computer systems or personal computers (PC). In particular, it is possible to use AMD Athlon or AMD Phenom processors or processor cores.

The above list is not intended to be understood to be conclusive. On the contrary, it is meant to be possible to use all processors that are also used in customary embedded computers or personal computers (PC). These may be embedded processors, desktop processors and/or mobile processors. Since such processors have usually been manufactured not primarily for safety-critical applications, they do not have to undergo the test procedures cited at the outset and also do not need to pass them. However, this means that the manufacturing and development costs of such processors are distinctly lower in comparison with certified processors. In this respect, the COTS processor cores can also be referred to as uncertified, that is to say certificate-free, processor cores. In particular, uncertified on the basis of one of the above test procedures and development procedures.

According to the invention, such COTS processor cores can nevertheless be used to provide a computer system that can be used in safety-critical fields, particularly in the aerospace industry. In particular, it is possible to achieve a reliability of $10^{-9}$ failures/hour for the computer system. For this purpose, the COTS processor cores—in the nonrestrictive example below there are meant to be three COTS processor cores, A, B and C—have an evaluation device connected to them which has comparison means for comparing the respective output signals with one another in pairs. By way of example, the output signal from the COTS processor core A is compared with the output signal from the COTS processor core B. In addition, the output signal from the COTS processor core B is compared with the output signal from the COTS processor core C, and the output signal from the COTS processor core C is compared with the output signal from the COTS processor core A.

If, in the ideal case, all three COTS processor cores output the same output signal, that is to say particularly that all three cores have calculated the same result for a prescribed calculation, then the comparison means will detect this in the comparison and will output corresponding comparison signals. That is to say that the comparison signals comprise the information that the respective cores have output the same output signals, that is to say calculated the same result.

If the COTS processor core A, for example, calculates a different result than the COTS processor cores B and C, however, then the COTS processor core A will output a different output signal than the COTS processor cores B and C. During the comparison of the output signals from core A and core B and during the comparison of the output signals from cores A and C, the comparison means will thus detect that the respective output signals are not the same and will output a corresponding comparison signal. In addition, the comparison means will detect that the output signals from core B and core C are the same and will output a corresponding comparison signal. This means that the comparison signals comprise particularly the information that cores B and C have output the same output signal, that is to say calculated the same result, and the core A has output a different output signal in comparison with cores B and C, that is to say calculated a different result. In this way, it is thus detected that two of the COTS processor cores B and C, have calculated a different result that the third COTS processor core, A. From a statistical point of view, it is more probable in this respect that the result from core A is incorrect.

According to one preferred refinement of the invention, more than three COTS processor cores are provided. In particular, the computer system comprises four, preferably 8, particularly 16 COTS processor cores. In a further exemplary embodiment of the invention, the COTS processor cores are comprised by one processor, in particular the COTS processor cores are integrated in the processor. According to yet another preferred embodiment, the COTS processor cores may also each be comprised by a single processor, in particular be integrated therein. By way of example, it is also possible for two COTS processor cores to be comprised by one processor, while the third COTS processor core is comprised by a further processor. The processor comprising the two COTS processor cores may quite generally also be referred to as a multi-core processor. In particular, a plurality of multi-core processors may be provided in the case of exemplary embodiments of the computer system according to the invention having more than three COTS processor cores.

According to a further preferred refinement of the invention, the computer system is comprised by an integrated circuit (IC, "Integrated Circuit"). That is to say, the individual electronic elements, particularly the COTS processor cores and/or the evaluation device, but also further electronic elements, particularly further logic circuits, are arranged and/or integrated on a substrate, particularly a semiconductor substrate. This allows a particularly miniaturized and inexpensive design. Such an arrangement can also be referred to as a single-chip system (SoC, "System-on-a-Chip").

In one preferred embodiment of the invention, the COTS processor cores are physically connected to the comparison means. That is to say that the COTS processor cores are connected to the comparison means by means of a respective data link. In particular, this allows the output signals to be transmitted to the comparison means without a great time delay. Alternatively or additionally, a switching device may also be provided that is connected between one or more COTS processor cores and the comparison means, said switching device receiving the output signals and then transmitting them to the comparison means. In particular, the switching device may be configured such that it transmits the output signals to the comparison means on the basis of a utilization state of the comparison means. It is thus advantageously possible to prevent already utilized comparison means from not also being burdened with further comparison calculations, which can result in a considerable time delay. The switching device may, in particular, be a bus, a routing device and/or a memory coherency device, which is configured such as to ensure coherency in memories that are connected to the COTS processor cores, for example RAM or cache memories. The switching device can also be referred to as a network-on-a-chip (NoC). In particular, the NoC may also be comprised by an integrated circuit. According to one exemplary embodiment of the invention, the NoC is certifiable for a safety-critical application, particularly on the basis of one of the test procedures cited at the outset, for example a verification procedure based on DO-254 and/or DO-178b.

In a further exemplary refinement of the invention, provision may be made for a selection device that is connected to the comparison means to be formed that is configured to take the comparison signals as the basis for selecting an output signal for further processing. This provides a redundant computer system. In this connection, redundancy means availability, i.e., the computer system is available for correct error-free operation. That is to say in the case of a calculation request to the computer system it is necessary for the processor and/or the processor cores to output the result within a predetermined period of time. In one preferred embodiment of the invention, the selection device comprises a logic OR circuit. In a further exemplary refinement of the invention, the comparison means comprise logic AND circuits. In a further exemplary embodiment of the invention, provision may be made for the selection device to be comprised by the COTS processor cores; in particular, the selection device may be integrated in the COTS processor cores.

In another preferred refinement of the invention, the selection device and the evaluation device are integrated in a logic circuit device. In particular, the logic circuit device is certifiable on the basis of one of the test procedures cited at the outset, particularly on the basis of a method based on DO-254 and/or DO-178b test procedures. By way of example, it is alternatively possible for the selection device and/or the evaluation device to be certifiable on the basis of one of these test procedures. This advantageously provides an even more failsafe computer system which is suitable for safety-critical applications, particularly in the aerospace industry.

In yet a further exemplary embodiment of the invention, the three COTS processor cores are each in the form of a logical COTS processor core or in the form of a physical COTS processor core.

In another preferred refinement of the invention, provision may be made for at least one of the three COTS processor cores to be different than the two other COTS processor cores. This advantageously allows integrity to be achieved with regard to systematic errors. By way of example, a processor core may have a serial error on the basis of which the processor core outputs erroneous results for particular calculations. However, this circumstance is compensated for by the processor cores that are different than this processor core, since the different nature means that these processor cores have a very high probability of not having this very serial error. By way of example, one COTS processor core may have been manufactured by the company AMD, while the other two COTS processor cores have been manufactured by the company Intel. Alternatively, in one exemplary refinement of the invention provision may be made for the processor cores to differ in terms of their clock frequency and/or in terms of their cache memory. By way of example, processor cores having a lower clock frequency and/or having little cache for tasks which are not very computation intensive, for example for signature calculation and/or signature analysis. The further processor cores having the higher clock frequency and/or having the larger cache memory can be used for particularly computation-intensive tasks. It is thus advantageously possible to save costs and nevertheless to provide a high-integrity and redundant computer system.

According to one preferred refinement of the method according to the invention, the comparison signals are transmitted to a selection device that is connected to the comparison means, wherein the selection device takes the transmitted comparison signals as a basis for selecting an output signal for further processing.

In another exemplary refinement of the method according to the invention, two output signals are classified as the same if respective parameters from the output signals are within a predetermined error tolerance range. By way of example, such parameters may be digitized results from particular computation operations, the discrepancy in which are within particular limits. This makes it possible to set the desired degree of integrity.

According to one preferred embodiment of the invention, the computer program is stored in a piece of firmware in the evaluation device. In particular, the firmware can be stored in a rewritable memory particularly in an EPROM or an EEPROM.

BRIEF DESCRIPTION OF THE DRAWING FIGURES

The invention is explained in more detail below using preferred exemplary embodiments with reference to drawings of figures, in which.

DETAILED DESCRIPTION

Figure 1:
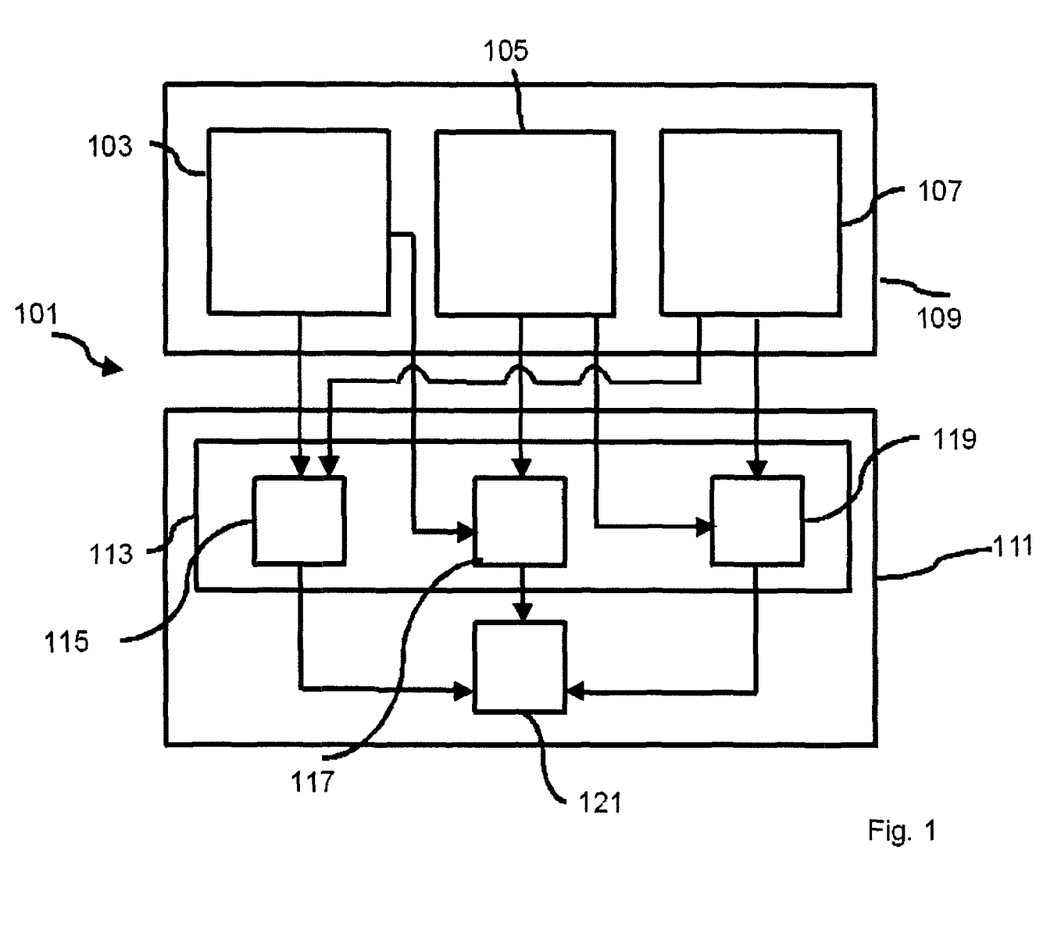
FIG. 1 shows a computer system according to the invention.

FIG. 1 shows a computer system 101 with three COTS processor cores 103, 105 and 107, which are preferably not of the same design. The three COTS processor cores 103, 105 and 107 are integrated in a processor 109. The processor 109 is thus a three-core processor. In an exemplary embodiment that is not shown, the processor 109 may be a four-core, eight-core or sixteen-core processor. In a further exemplary embodiment that is not shown, the three COTS processor cores 103, 105 and 107 are each integrated in a separate processor.

The computer system 101 also comprises a logic circuit device 111 in which an evaluation device 13 is integrated. The evaluation device 113 comprises three comparison means 115, 117 and 119. The comparison means 115 is connected to the COTS processor 103 and 107, and receives the respective output signals from the COTS processor cores 103 and 107. The comparison means 117 is connected to the COTS processor cores 103 and 105 and receives the respective output signals from the COTS processor cores 103 and 105. The comparison means 119 is connected to the COTS processor cores 105 and 107 and receives the respective output signals from the COTS processor cores 105 and 107. In an embodiment that is not shown, the comparison means 115, 117 and 119 each comprise a logic AND circuit.

Furthermore, the logic circuit device 111 has a selection device 121 integrated in it that is connected to the comparison means 115, 117 and 119. In an embodiment that is not shown, the selection device 121 comprises a logic OR circuit.

The comparison means 115 will compare the respective output signals from the COTS processor cores 103 and 107 with one another and output a corresponding comparison signal and transmit it to the selection device 121. The comparison signal comprises the information regarding whether respective parameters, for example phase, frequency and/or amplitude, of the output signals are within a predetermined error tolerance range. If the respective parameters are within the predetermined error tolerance range, the respective output signals are classified as the same.

In the same manner, the comparison means 117 compares the respective output signals from the COTS processor cores 103 and 105. Likewise similarly, the comparison means 119 compares the respective output signals from the COTS processor cores 105 and 107. The comparison means 117 and 119 then similarly output a comparison signal that corresponds to the respective comparison and transmit it to the selection device 121.

If all three COTS processor cores 103, 105 and 107 have output the same output signal, the selection device 121 can select one of the three output signals for further processing. If one of the three COTS processor cores 103, 105 and 107 outputs a different output signal than the other two COTS processor cores, the selection device 121 will reject the other output signal because, from a statistical point of view, it is more probable that this other output signal is based on an incorrect calculation than the respective output signals from the other two COTS processor cores, which have output an output signal that is the same. The selection device 121 will then select an output signal for further processing from the two output signals that are classified as the same.

Figure 2:
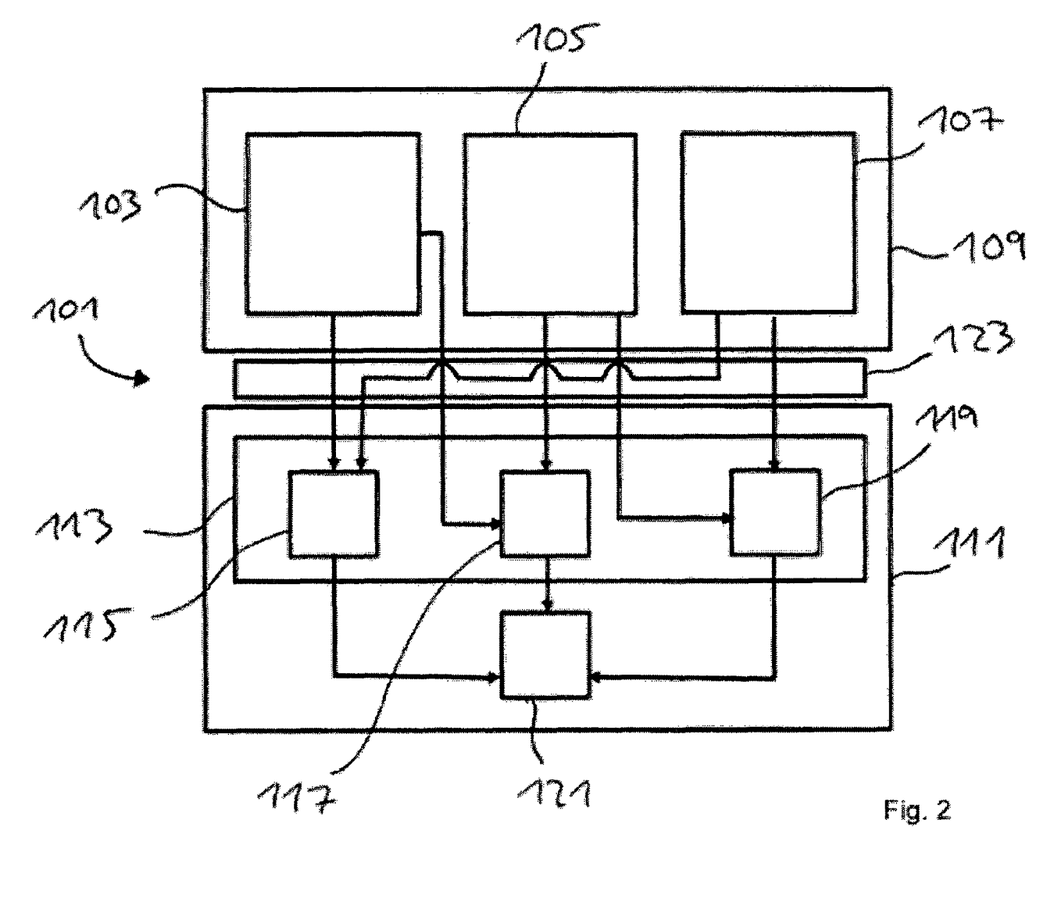
FIG. 2 shows the computer system according to the invention from FIG. 1 with an NoC.

FIG. 2 shows the computer system 101 from FIG. 1, with additionally a NoC 123 being connected to the three COTS processor cores 103, 105 and 107.

Figure 3:
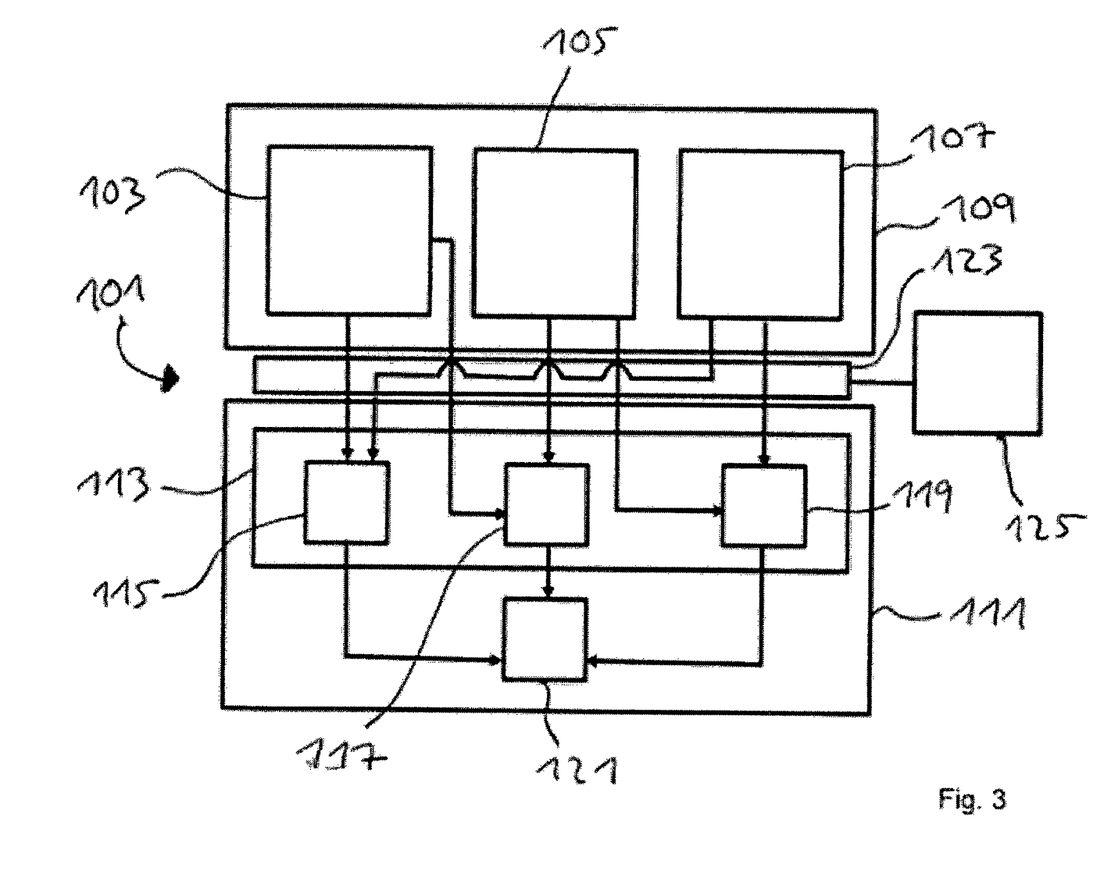
FIG. 3 shows the computer system according to the invention from FIG. 2 with an external receiver.

As FIG. 3 shows, the NoC 123 may be connected to an external receiver 125. The NoC 123 transmits particularly the output signals to the external receiver 125. In addition or as an alternative, the NoC 123 can transmit the output signal selected by means of the selection device 121 to the external receiver 125. The NoC 123 is certifiable, in particular, for example on the basis of one of the above test procedures, with it being necessary for the NoC 123 to have successfully passed not the entire test procedure but rather only test procedures of a specific application. Such an application may be, in particular, memory access, communication, routing, a network or preprocessing of data, for example filters, a network or preprocessing of data, for example filters, or a combination of these. In particular, the NoC 123 may comprise what is known as "memory consistency logic" (not shown).

By way of example, the external receiver 125 may comprise or be integrated in an actuator (not shown). By way of example, an actuator may be a landing flap, a tail unit or a landing gear on an aircraft or on a space shuttle. The selected signal can then be used to control the actuator. By way of example, the landing flaps are extended. Since the computer system 101 is used to reject incorrect calculations, it is not possible for an incorrect signal, particularly a control signal, to be transmitted to the actuator, which means that the actuator is controlled on the basis of a correct control demand.

By way of example, a pilot of an aircraft can give the command to extend the landing flaps, specifically on the basis of an aircraft speed. The three COTS processors 103, 105 and 107 each receive a measured aircraft speed value and, independently of one another, calculate an appropriate landing flap position. The respective landing flap positions are then compared by means of the logic circuit device 111 and any incorrect landing flap positions are rejected. The NoC 123 then transmits a control signal associated with the correct landing flap position to the landing flaps, whereupon said landing flaps extend or retract to the appropriate position. An incorrect signal is thus not transmitted, which means that operation of the aircraft is advantageously particularly safe.

Figure 4:
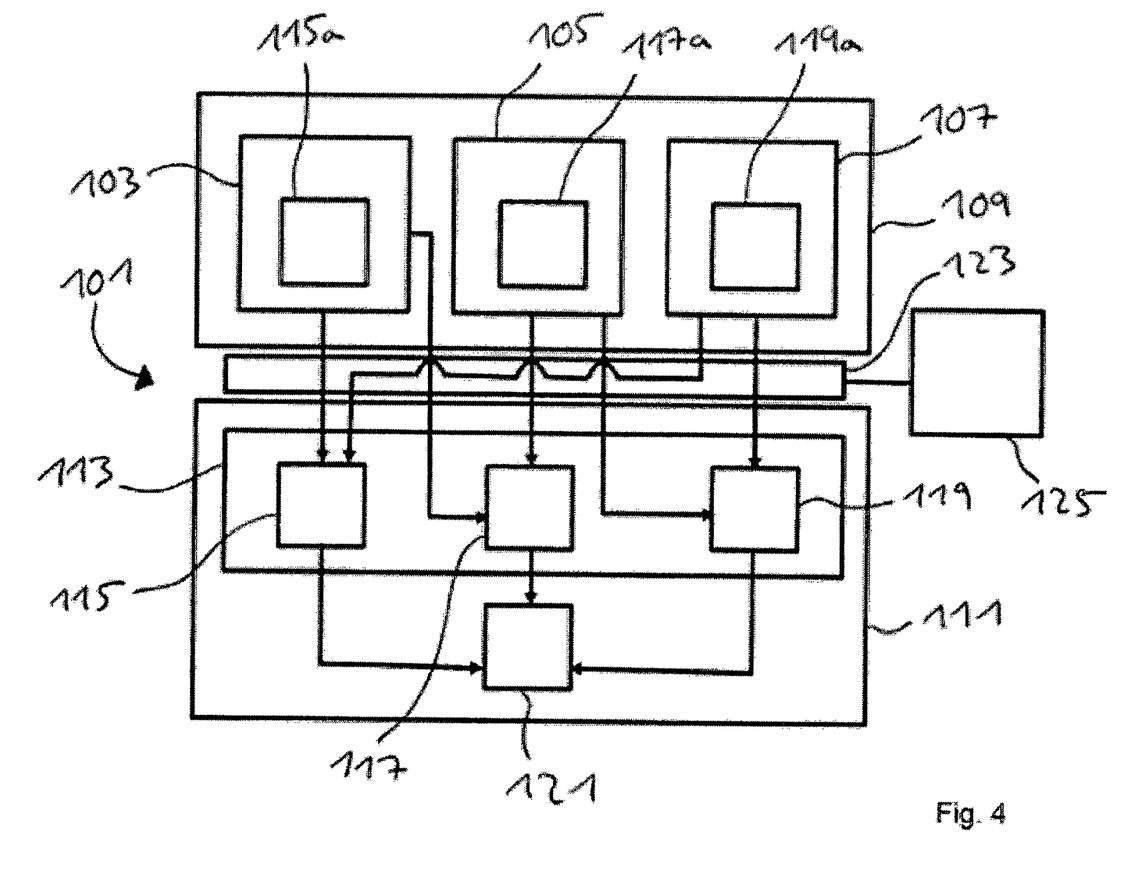
FIG. 4 shows the computer system according to the invention from FIG. 3, wherein the COTS processor cores have comparison means.

FIG. 4 shows the computer system 101 from FIG. 3, wherein the COTS processors 103, 105 and 107 each comprise comparison means 115a, 117a and 119a. In particular, the comparison means 115a, 117a and 119a are formed such as to compare at least some of the output signals with one another, particularly in pairs. Hence, the comparison of at least some of the output signals can be relocated from the comparison means 115, 117 and 119 to the comparison means 115a, 117a and 119a, as it were. This advantageously makes efficient use of the computation power of modern COTS processors.

Figure 5:
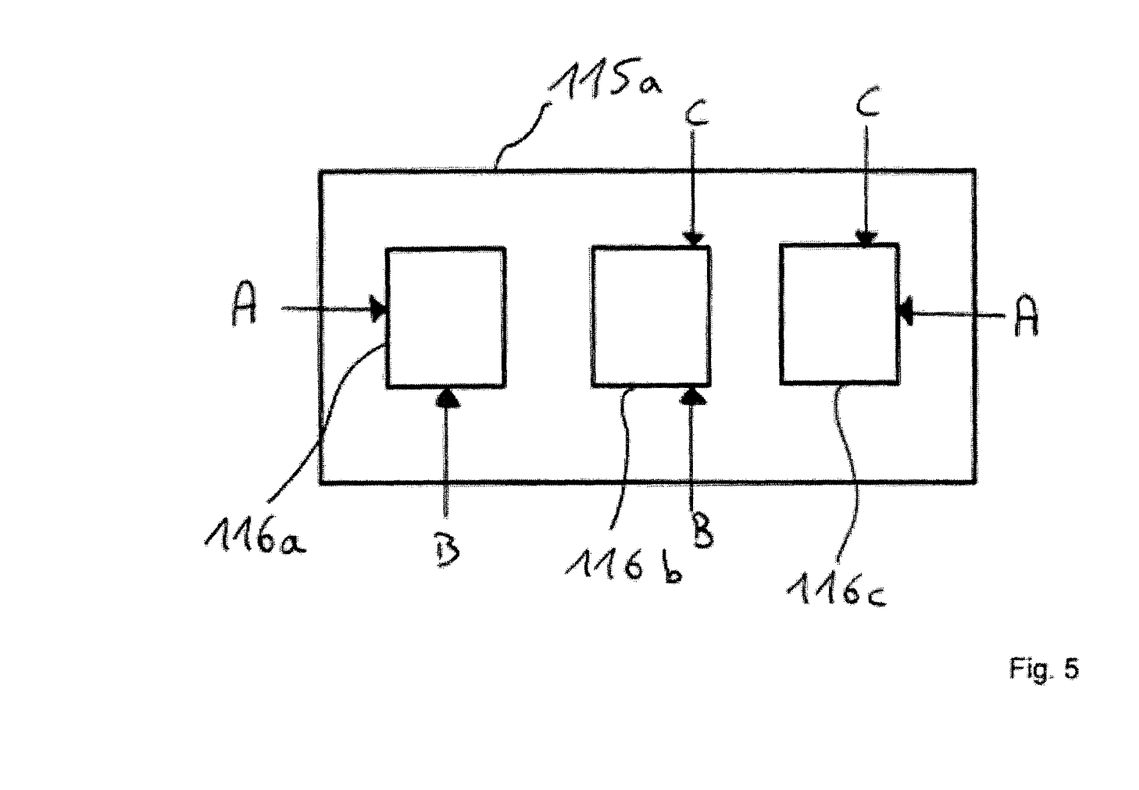
FIG. 5 shows a schematic view of the comparison means of the processor cores from FIG. 4.

FIG. 5 schematically shows the comparison means 115a, the comparison means 117a and 119a being in a similar form. The comparison means 115a comprises three logic AND circuits 116a, 116b and 116c. The output signals from the COTS processors 103, shown as arrow A, and 105 shown as arrow B, are transmitted to the logic circuit 116a. Similarly, the output signals from the COTS processor cores 105 and 107, shown as arrow C, are transmitted to the logic circuit 116b and the output signals from the COTS processors 103 and 107 are transmitted to the logic circuit 116c. The calculations by the respective COTS processor cores 103, 105 and 107 are thus compared with one another in pairs. Each logic circuit 116a, 116b and 116c will output the result of the paired comparison and transmit it to the NoC 123 and/or the logic circuit device 111, for example. The NoC 123 and/or the logic circuit device 111 can then use the results from the comparison means 115a and also the results from comparison means 117a and 119a to ascertain whether the calculations are correct or whether and which calculations or which output signals need to be rejected.

Figure 6:
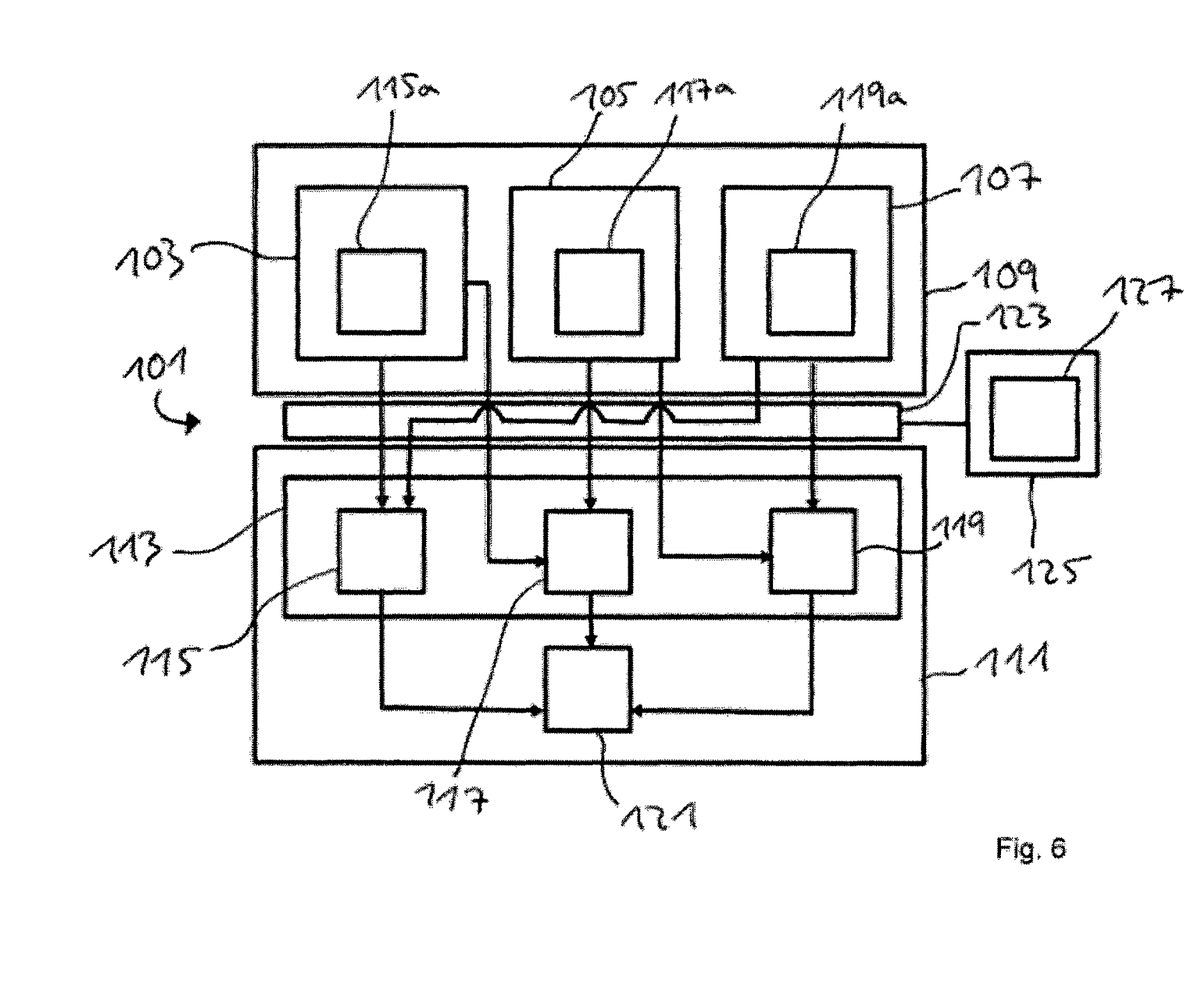
FIG. 6 shows the computer system according to the invention from FIG. 4 with an external receiver.

FIG. 6 shows the computer system 101 from FIG. 4 with the external receiver 125 from FIG. 3, the receiver 125 additionally having yet a further comparison means 127. This further comparison means 127 is formed particularly such as to compare the output signals from the COTS processor cores 103, 105 and 107 and/or the signals which are output by the comparison means 115a, 117a and 119a with one another in order to determine a correct result and to reject incorrect results. In this exemplary embodiment, comparison of at least some of the signals by the logic circuit device 111 is therefore relocated to the receiver 125, as it were. In particular, provision may be made for the further comparison means 127 to compare exclusively the output signals with one another. In this case, the NoC 123 is then used merely for communication and for transmitting the output signals to the external receiver 125.

Although the exemplary embodiments above relate to three processor cores, a plurality of processor cores may also be provided. In particular, it is also possible for just two processor cores to be provided. In this case, particularly the calculations by the two processor cores are then compared with one another, and only if they match is a corresponding control signal transmitted to the external receiver, which may comprise an actuator, in particular. Alternatively, provision may be made for the calculations by the two processor cores to be transmitted to the receiver by means of the NoC directly, for example. In this case, the receiver will then use the further comparison means to compare the calculations with one another and will operate the actuator, for example will extend the landing flaps, only in the event of a match.

In summary, it is possible, particularly by means of the inventive connection of the three COTS processors 103, 105 and 107 to the comparison means 115, 117 and 119, to provide a computer system which is both redundant and exhibits a high level of integrity, and which can be used for safety-critical applications, particularly in the aerospace industry, for example in a space shuttle. Since only the computer system as such but not also the individual COTS processors 103, 105 and 107, in addition, has/have to satisfy the high demands on the aforementioned test procedures so that the computer system can be used for safety critical applications in the aerospace industry, for example, significant costs can be saved without having to dispense with a high level of safety, for example fail safety.

LIST OF REFERENCE SYMBOLS

101 Computer system
103, 105, 107 COTS processor cores
109 Processor
111 Logic circuit device
113 Evaluation device
115, 117, 119, 115a, 117a, 119a Comparison means
121 Selection device
123 NoC
125 External receiver
127 Further comparison means

The invention claimed is:

1. A computer system, comprising:
   at least three commercial off-the-shelf (COTS) processor cores; and
   an evaluation device, which is connected to the at least three COTS processor cores, the evaluation device is configured to evaluate output signals that are output from the at least three COTS processor cores, wherein the evaluation device includes a comparator configured to compare a relocatable group of the output signals that are output with one another in pairs, wherein the comparator of the evaluation device is also configured to output a comparison signal that corresponds to the respective comparison of the relocatable group of the output signals, and wherein
   at least one of the COTS processor cores is different than the other COTS processor cores,
   a selection device, connected to the comparator of the evaluation device, configured to select an output signal for further processing based on the comparison signal,
   the at least three COTS processor cores each comprise a corresponding comparator to compare non-relocatable output signals of the output signals with one another, and
   the computer system further comprises a switching device that is connected between the COTS processor cores and the comparator of the evaluation device, wherein the switching device is configured to transmit the relocatable group of the output signals to the comparator of the evaluation device on the basis of a utilization state of the comparator of the evaluation device.

2. The computer system as claimed in claim 1, wherein the selection device and the evaluation device are integrated in a logic circuit device.

3. The computer system as claimed in claim 1, wherein the at least three COTS processor cores are each formed as a logical COTS processor core or as a physical COTS processor core.

4. The computer system as claimed in claim 1, wherein a network-on-a-chip is connected to the COTS processor cores.

5. A method for comparing output signals that are output by at least three commercial off-the-shelf (COTS) processor cores, wherein the COTS processor cores each comprise a comparator to compare a non-relocatable group of the output signals with one other and at least one of the COTS processor cores is different than the other COTS processor cores, comprising the following steps:
   transmitting a relocatable group of the output signals of the COTS processor cores, to an evaluation device that includes a further comparator;
   comparing, by the further comparator of the evaluation device, the relocatable group of the transmitted output signals with one another in pairs; and
   outputting, by the further comparator of the evaluation device, a comparison signal that corresponds to the respective comparison of the relocatable group of output signals,
   transmitting the comparison signal to a selection device that is connected to the further comparator of the evaluation device, wherein the selection device selects an output signal for further processing based on the transmitted comparison signal, and
   transmitting the relocatable group of the output signals by a switching device that is connected between the COTS processor cores and the further comparator of the evaluation device, wherein the switching device is configured to transmit the relocatable group of the output signals to the further comparator of the evaluation device on the basis of a utilization state of the further comparator of the evaluation device.

6. The method as claimed in claim 5, wherein three output signals are classified as the same if respective parameters from the output signals are within a predetermined error tolerance range.

7. A computer program stored on a non-transitory storage medium, the computer program having program code for:
   receiving output signals of at least three commercial off-the-shelf (COTS) processor cores, wherein the COTS processor cores each comprise a comparator to compare a non-relocatable group of the output signals with one other and at least one of the COTS processor cores is different than the other COTS processor cores;

comparing, by a further comparator of an evaluation device, a relocatable group of the transmitted output signals with one another in pairs;

outputting, by the further comparator of the evaluation device, a comparison signal that corresponds to the respective comparison of the relocatable group of the output signals;

transmitting the comparison signal to a selection device that is connected to the further comparator of the evaluation device, wherein the selection device selects an output signal for further processing based on the transmitted comparison signal; and transmitting the relocatable group of the output signals by a switching device that is connected between the COTS processor cores and the further comparator of the evaluation device, wherein the switching device is configured to transmit the relocatable group of the output signals to the further comparator of the evaluation device on the basis of a utilization state of the further comparator of the evaluation device.

8. The computer program as claimed in claim 7, wherein three output signals are classified as the same if respective parameters from the output signals are within a predetermined error tolerance range.

9. The method of claim 5, further comprising classifying three of the output signals as the same if respective parameters from such output signals are within a predefined error tolerance range.

* * * * *